United States Patent Office 3,131,206
Patented Apr. 28, 1964

3,131,206
POLYALKYLENE GLYCOL ESTERS OF ALPHA-HYDROXY BETA,BETA,BETA-TRICHLOROETHANE PHOSPHONIC ACID
Lester Friedman, Beachwood Village, Ohio, assignor, by mesne assignments, to Union Carbide Corporation, a corporation of New York
No Drawing. Filed Jan. 18, 1962, Ser. No. 167,175
9 Claims. (Cl. 260—461)

This invention relates to the preparation of novel phosphonates and polyurethanes.

It is an object of the present invention to prepare novel secondary phosphonates.

Another object is to prepare novel phosphorus containing polyurethanes.

Still further objects and the entire scope of applicability of the present invention will become apparent from the detailed description given hereinafter; it should be understood, however, that the detailed description and specific examples, while indicating preferred embodiments of the invention, are given by way of illustration only, since various cahnges and modifications within the spirit and scope of the invention will become apparent to those skilled in the art from this detailed description.

It has now been found that these objects can be attained by reacting chloral with a compound having the formula $$HOR_1O\overset{H}{\underset{|}{P}}{-}{\left(OR_2O\overset{H}{\underset{|}{P}}\right)}_n OR_3OH$$

where $R_1$, $R_2$ and $R_3$ are the residues of a polyalkylene glycol from which the two hydroxyl groups have been removed and $n$ is zero or an integer.

Preferably $R_1$, $R_2$ and $R_3$ are residues of dipropylene glycol or diethyleneglycol and $n$ is preferably zero or 1.

The reaction is normally carried out in the presence of an alkaline catalyst.

The compounds of the present invention have the formulae

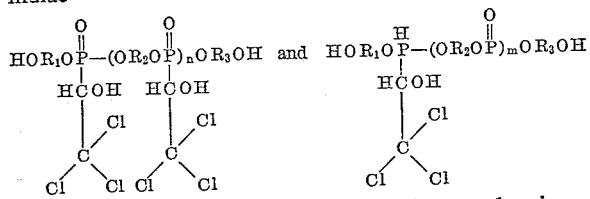

where $R_1$, $R_2$, $R_3$ and $n$ are as defined above and $m$ is an integer of 1 or more.

Typical examples of compounds within the present invention are bis-dipropylene glycol α-hydroxy-B,B,B-trichloroethanephosphate, bis-diethylene glycol α-hydroxy-B,B,B-trichloroethanephosphonate, bis-tripropylene glycol-α - hydroxy - B,B,B-trichloroethanephosphonate, bis-polypropylene glycol 425-α-hydroxy-B,B,B-trichloroethanephosphonate, bis - polypropylene glycol 2025-α-hydroxy-B,B,B-trichloroethanephosphonate, bis - polyethylene glycol 3000 - α - hydroxy - B,B,B - trichloroethanephosphonate, bis ditetramethylene glycol - α - hydroxy-B,B,B-trichloroethanephosphonate, tris dipropylene glycol bis α-hydroxy-B,B,B-trichloroethane diphosphonate, tris diethylene glycol bis α-hydroxy-B,B,B-trichloroethane diphosphonate, tetra dipropylene glycol tris α-hydroxy-B,B,B-trichloroethane triphosphonate, bis-(block copolymer of polyproylene glycol 1620 molecular weight +17.4% ethylene oxide)-α-hydroxy-B,B,B-trichloroethanephosphonate.

As starting materials there are employed secondary phosphites such as bis-dipropylene glycol phosphite, bis-tripropylene glycol phosphite, bis-polypropylene glycol molecular weight 425 phosphite, bis-polypropylene glycol molecular weight 1025 phosphite, bis-polypropylene glycol molecular weight 2025 phosphite, bis-diethylene glycol phosphite, bis-polyethylene glycol molecular weight 3000 phosphite, bis-ditetramethylene glycol phosphite, tris dipropylene glycol bis phosphite, tris diethylene glycol bis phosphite, tris tripropylene glycol bis phosphite, tetra dipropylene glycol tris phosphite.

The di phosphites and tri phosphites can be prepared by heating the corresponding mono phosphite and removing the diol formed by distillation or by eacting the polyalkylene glycol with the stoichiometric amount of dialkyl phosphite. Thus tris dipropylene glycol bis phosphite can be formed by heating bis dipropylene glycol phosphite in a vacuum and removing dipropylene glycol by distillation until 0.5 mol has been removed for each mol of the starting phosphite.

As alkaline catalyst there can be used tertiary amines, e.g., trimethyl amine, triethyl amine, tributyl amine, dimethyl amline, pyridine, N-methyl morpholine triethylene diamine, sodium phenolate, sodium methylate, anion exchange resins, e.g., the quaternized aminomethyl styrene-divinyl benzene copolymers such as Amberlite IR–410, etc. The amount of catalyst is not critical and can be from 0.1–10% by weight of the reactants.

When using polyphosphites such as tris-dipropylene glycol bis phosphite several different products can be obtained depending on the molar ratio of chloral to phosphite. Thus from one mole of tris dipropylene glycol bis phosphite and one mol of chloral there is obtained tris dipropylene glycol phosphite α-hydroxy-B,B,B'-trichloroethanephosphonate while when two moles of chloral are employed per mol of tris dipropylene glycol bis phosphite the product is tris dipropylene glycol bis α-hydroxy-B,B,B-trichloroethane diphosphonate.

The phosphonates of the present invention are useful in polyester formulations. Thus they can be reacted mol for mol with maleic anhydride, phthalic anhydride, dimethyl terephthalate, fumaric acid and adipic acid to form such polyesters.

They are also useful as reactive intermediates in forming epoxy resins. They are particularly valuable in forming polyurethanes. The urethane polymers so formed are flame resistant and are useful as linings for textiles, insulation in building construction, upholstery filling material, carpet underlays, shock absorbing fillings for packages, etc.

Unless otherwise indiacted all parts and percentages are by weight.

Example 1

105 grams (0.33 mol) of bis dipropylene glycol phosphite and 3.5 grams of triethyl amine were treated with 50 grams (0.33 mol) of chloral with efficient agitation and external cooling to keep the exothermic reaction under control. When the exotherm subsided the colorless liquid was heated on a steam bath and the volatile materials present, e.g., the triethyl amine and any unreacted chloral, were removed in a vacuum. The clear, colorless viscous liquid was essentially pure bis-dipropylene glycol-α-hydroxy-B,B,B-trichloroethanephosphonate.

Example 2

The process of Example 1 was repeated replacing the bis-dipropylene glycol phosphite by 77 grams (0.33 mol) of bis diethylene glycol phosphite to give as a clear, colorless viscous liquid residue bis-diethylene glycol α-hydroxy-B,B,B-trichloroethane phosphonate.

Example 3

The process of Example 1 was repeated replacing the bis-dipropylene glycol phosphite by 100 grams (0.2 mol) of tris-dipropylene glycol bis-phosphite and replacing the chloral by 60 grams (0.4 mol) of chloral. The product was a clear, colorless very viscous liquid which was tris-dipropylene glycol bis-α-hydroxy-B,B,B-trichloroethane diphosphonate.

*Example 4*

The process of Example 3 was repeated replacing the tris-dipropylene glycol bis-phosphite by 0.2 mol of tris-diethylene glycol bis-phosphite to produce tris-diethylene glycol bis-α-hydroxy-B,B,B-trichloroethane diphosphonate.

*Example 5*

The procedure of Example 3 was repeated using only 0.2 mol of chloral to produce tris-dipropylene glycol phosphite α-hydroxy-B,B,B-trichloroethane phosphonate.

As previously indicated the phosphonates of the present invention can be reacted with polyisocyanates to form polyurethanes. They can be the sole hydroxyl reactant present or they can be used in admixture with other polyhydroxy compounds (polyols) in forming the polyurethanes. Foamed polyurethanes can be obtained by adding water prior to or simultaneously with the addition of the polyisocyanate.

Alternately, foams can be made by uniformly distributing a liquified fluorine containing haloalkane in either the phosphonate or polyisocyanate reactant and then mixing the reactants and permitting the temperature of the mixture to rise during the ensuring reaction above the boiling point of the liquified gas, e.g., dichlorofluoromethane.

Foamed polyurethanes can be made by either the one shot or two step procedure. The polyurethanes prepared according to the invention are solids and can be used in the manner previously indicated.

The unfoamed polyurethanes can be molded into cups and other articles and used to form protective coatings on wood, steel or glass.

As examples of organic polyisocyanates which can be employed to make the polyurethanes there can be employed toluene 2,4-diisocyanate, toluene 2,6-diisocyanate, 4-methoxy-1,3-phenylene diisocyanate, diphenyl methane-4,4′-diisocyanate, 4,4′-methylene bis(phenylisocyanate), naphthalene diisocyanate, hexamethylene diisocyanate, toluene-2,4,6-triisocyanate, the reaction product of toluene diisocyanate with trimethylolpropane at an NCO/OH ratio of 2:1, etc.

Alternatively as the polyisocyanate there can be used a prepolymer made by reacting one of the above polyisocyanates with a polyhydroxy compound. Thus there can be used prepolymers of toluene diisocyanate and castor oil, toluene diisocyanate and ethylene glycol-propylene glycol-adipate described in Kohrn Patent 2,953,839 Example I, toluene diisocyanate and polypropylene glycol 2025; toluene diisocyanate and LG–56 (glycerine-propylene oxide adduct) having a molecular weight of 3000, etc. Any of the prepolymers and polyisocyanates set forth in Friedman application 145,749 can be used.

The polyol phosphonates of the present invention can be used in admixture with other polyhydroxy compounds in forming the polyurethanes. Examples of such compounds are polyethyleneglycols having molecular weights of 400 to 3000, polypropylene glycols having molecular weights of 400 to 3000, ethylene glycol, propylene glycol, dipropylene glycol, diethylene glycol, 1,4-butanediol, glycerol, trimethylolpropane, glycerine-propylene oxide adducts of molecular weights 1000 and 3000, hexanetriol 1,2,6-propylene oxide adducts of molecular weights 750, 1500, 2400 and 4000, pentaerythritol-propylene oxide adduct of molecular weight 1000, castor oil, N,N,N′,N′-tetrakis (2-hydroxyethyl) ethylene diamine, N,N,N′,N′-tetrakis(2-hydroxypropyl) ethylene diamine (Quadrol), polyethylene adipate phthalate having free hydroxyl groups, tris-dipropylene glycol phosphite, etc.

From 5 to 100% by weight of the hydroxyl component can be the polyol phosphonate of the present invention.

In preparing the polyurethanes there can be used any of the conventional basic catalysts, e.g., N-methyl morpholine, N-ethyl morpholine, tributyl amine, 2-diethylamino-acetamide, Quadrol, N,N′-dimethylpiperazine, and sodium phenolate. Then can also be used tin compounds such as stannous octoate, dibutyltin dilaurate, dibutyltin acetate, tributyltin laurate, dibutyltin ethoxide, octylstannoic acid, triphenyltin hydride, dibutyltin oxide etc. There can be used any of the basic compound and tin compounds set forth in Friedman application 145,749.

Conventional surfactants can be added in the amount of 1% or less. The preferred surfactants are silicones, e.g., polydimethyl siloxanes having a viscosity of 3 to 100 centistokes, triethoxydimethyl polysiloxane molecular weight 850 copolymerized with a dimethoxypolyethylene glycol of molecular weight 750 as well as any of the other siloxanes disclosed in Hostettler French Patent 1,212,252.

In the following examples there was employed the formulation

| | Grams |
|---|---|
| Water | 0.37 |
| Dibutyltin | 0.07 |
| Polydimethyl siloxane (50 centistokes grade) | 0.12 |
| N-ethyl morpholine | 0.1 |

This mixture is designated in the following examples as Formulation A.

*Example 6*

The polyol used in Formulation A was a mixture of 1.1 grams of bis-dipropylene glycol-α-hydroxy-B,B,B-trichloroethanephosphonate and 7 grams of polypropylene glycol 2075. Upon addition of 5.2 grams of toluene diisocyanate there was produced a solid foam.

*Example 7*

The polyol used in Formulation A was a mixture of 1.0 gram of bis diethylene glycol α-hydroxy-B,B,B-trichloroethanephosphonate and 7 grams of LG–56 (glycerol-propylene oxide adduct molecular weight 3000). Upon addition of 5.2 grams of toluene diisocyanate there was produced a solid foam.

*Example 8*

The polyol used in Formulation A was a mixture of 1.3 grams of tris dipropylene glycol bis α-hydroxy-B,B,B-trichloroethane diphosphonate and 7 grams of polypropylene glycol 2025. Upon addition of 5.2 grams of toluene diisocyanate there was produced a solid foam.

*Example 9*

Formulation A was used omitting the water and employing 3.1 grams of bis dipropylene glycol α-hydroxy-B,B,B-trichloroethanephosphonate. There was then added 5.2 grams of toluene diisocyanate and the mixture allowed to form a prepolymer. There was then added 0.31 ml. of water and the foam obtained was cured at 110° C.

What is claimed is:
1. A member of the group consisting of phosphonates having the formulae

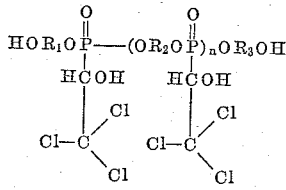

and

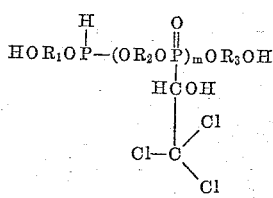

where $R_1$, $R_2$ and $R_3$ are the residues of a polyalkylene glycol from which the two hydroxyl groups have been removed, $n$ is selected from zero and an integer and $m$ is an integer.

2. A bis polypropylene glycol α-hydroxy-B,B,B-trichloroethanephosphonate.

3. Bis dipropylene glycol α-hydroxy-B,B,B-trichloroethanephosphonate.

4. A bis polyethylene glycol α-hydroxy-B,B,B-trichloroethanephosphonate.

5. Bis diethylene glycol α-hydroxy-B,B,B-trichloroethanephosphonate.

6. A tris polypropylene glycol bis-α-hydroxy-B,B,B-trichloroethane diphosphonate.

7. Tris dipropylene glycol bis-α-hydroxy-B,B,B-trichloroethane diphosphonate.

8. A tris polyethylene glycol bis-α-hydroxy-B,B,B-trichloroethane diphosphonate.

9. Tris diethylene glycol bis-α-hydroxy-B,B,B-trichloroethane diphosphonate.

References Cited in the file of this patent
UNITED STATES PATENTS

| | | |
|---|---|---|
| 2,721,876 | Dickey | Oct. 25, 1955 |
| 2,844,618 | Johnson | July 22, 1958 |
| 2,866,774 | Price | Dec. 30, 1958 |
| 2,929,800 | Hill | Mar. 22, 1960 |